United States Patent [19]

Woitzel

[11] Patent Number: 4,772,129
[45] Date of Patent: * Sep. 20, 1988

[54] MIXING HEAD FOR MIXING AT LEAST TWO PLASTIC-FORMING COMPONENTS

[75] Inventor: Heinz Woitzel, Ibbenbüren, Fed. Rep. of Germany

[73] Assignee: IBW Ingenieur-Büro Woitzel GmbH, Ibbenbüren, Fed. Rep. of Germany

[*] Notice: The portion of the term of this patent subsequent to Jan. 26, 2005 has been disclaimed.

[21] Appl. No.: 81,930

[22] Filed: Aug. 5, 1987

[30] Foreign Application Priority Data

Aug. 16, 1986 [EP] European Pat. Off. ......... 86111334.8

[51] Int. Cl.⁴ ............................................. B01F 5/04
[52] U.S. Cl. ................................... 366/177; 366/189; 366/267; 422/133; 422/135; 422/224
[58] Field of Search .................. 366/349, 307, 69, 77, 366/76, 96, 177, 184, 182, 183, 160, 176, 341, 165, 336, 337, 267–269, 131–134; 422/133, 135, 224; 425/244; 222/190, 556, 557; 239/461, 590.5

[56] References Cited

U.S. PATENT DOCUMENTS 2,684,690  7/1954  Lee ................................... 239/590.5
4,141,470  2/1979  Schulte et al. ...................... 422/133
4,440,500  4/1984  Schneider .......................... 366/177
4,442,070  4/1984  Proska et al. ...................... 422/133

FOREIGN PATENT DOCUMENTS 138592  11/1901  U.S.S.R. .............................. 366/336

Primary Examiner—Timothy F. Simone
Attorney, Agent, or Firm—Jordan and Hamburg

[57] ABSTRACT

A mixing head is created for mixing two plastic-forming components, having a mixing chamber and an ejection piston guided in a passage of the same cross section, in which, while retaining the mechanical self-clearing of the exit passage and mixing chamber by the eject piston and an intensive mixing of the reaction components, a quieting of the liquid component mixture after leaving the mixing chamber is achieved by providing a transversely movable choke member at the downstream end of the mixing chamber. When the choke member is in the choke position, one side of it situated in the exit passage forms a choke gap expanding diffuser-like toward the exit opening of the exit passage, and in a cleaning position, a cavity which it contains is brought into alignment with the exit passage, so that the eject piston can perform its passage clearing stroke.

19 Claims, 2 Drawing Sheets

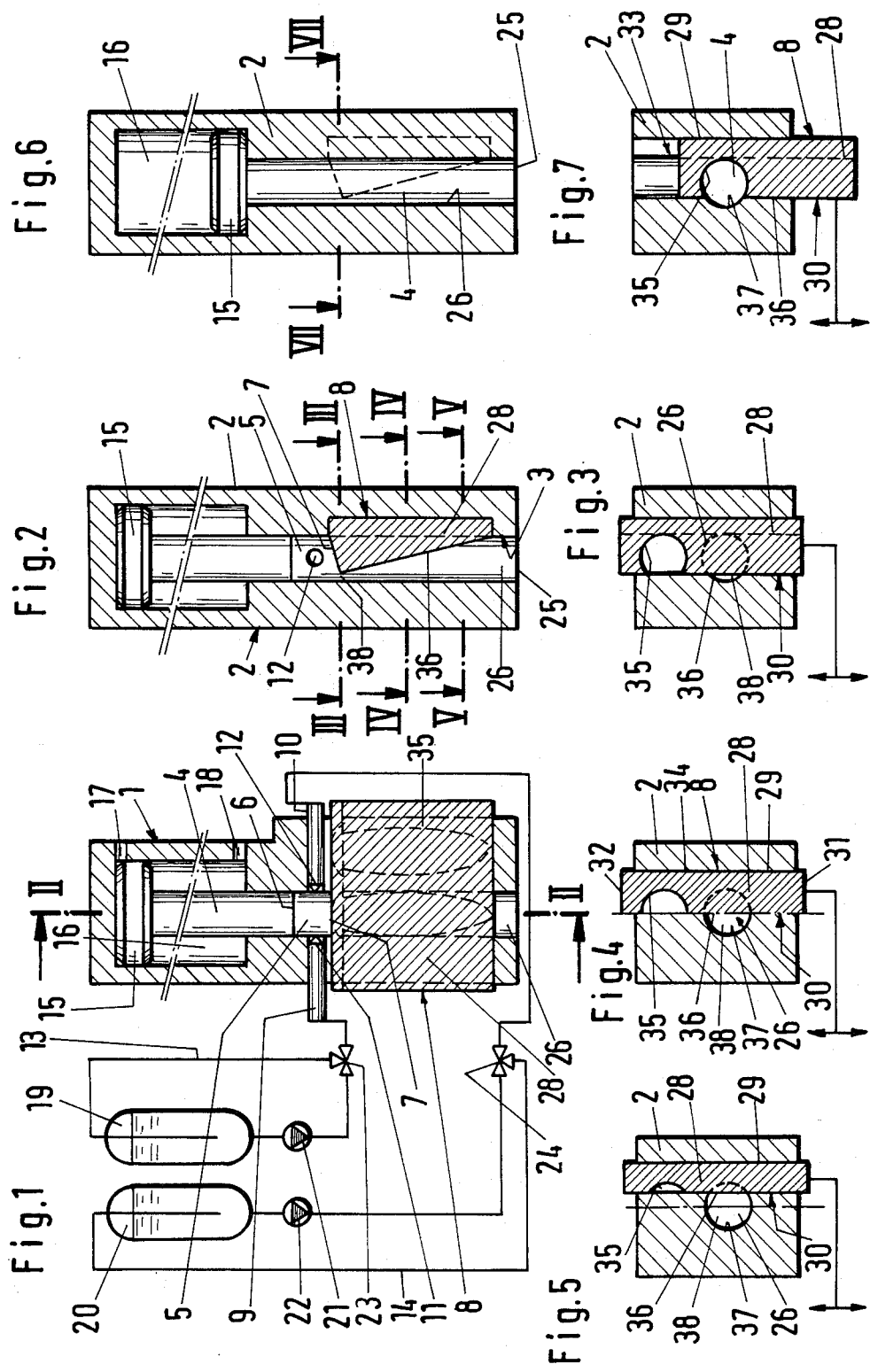

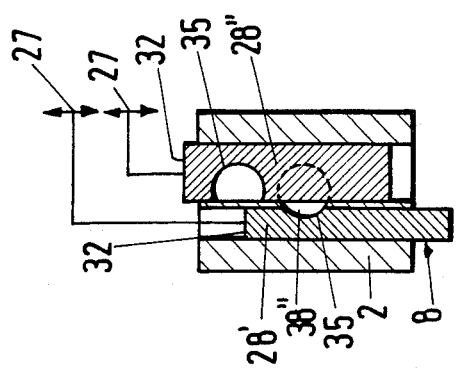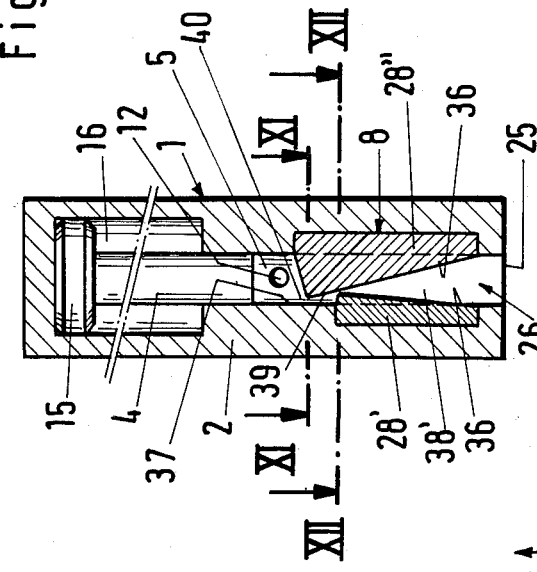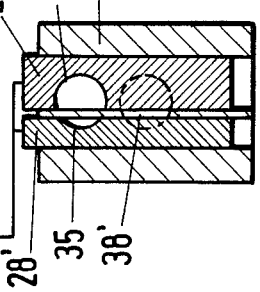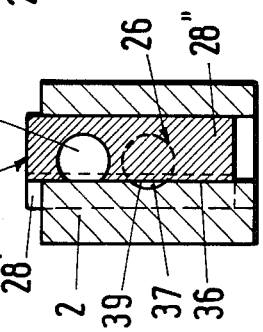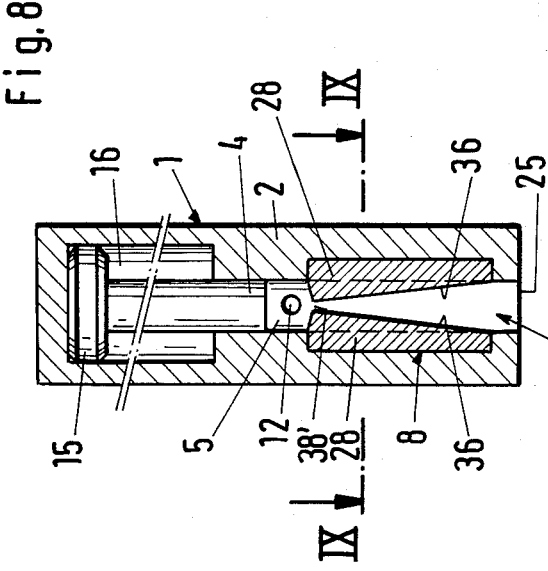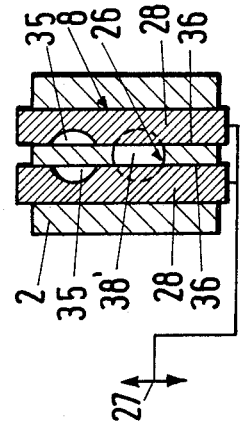

MIXING HEAD FOR MIXING AT LEAST TWO PLASTIC-FORMING COMPONENTS

The invention relates to a mixing head for mixing at least two plastic-forming components.

In a known mixing head of this kind, for the mixing of plastic components which form in their chemical reaction preferably a foam substance, especially a polyurethane foam, the choke member which can be moved transversely with respect to the guiding passage is provided with an opening whose cross section corresponds at least to the cross section of the ejector piston. When the opening of the choke member is in alignment with the guiding or ejection passage, mechanical clearing of the mixing chamber and exit passage by the eject piston is possible, while when the opening of the choke member is in a position offset transversely from the passage, forming a narrowed transfer opening between the mixing chamber and the interior of the opening, a turbulence chamber is formed in the interior of the opening, whereby the intensity of the mixing of the reaction components is said to be improved. Through the forming of such a turbulence chamber for the liquid component mixture brought through the opening of the choke member great turbulence is formed in the mixture, which even in the exit passage, after leaving the turbulence chamber, does not undergo sufficient quieting in such a degree as to prevent flaws in the product, especially due to air inclusions.

Also known is a mixing head for the production of a chemically reactive mixture from at least two plastic components of the kind described, in which the choke member consists of a plurality of baffles disposed in a row or offset one beside the other, which can be introduced into the mixing chamber from opposite sides of the latter. In this case too, an advantageous mechanical self-clearing of the exit passage and of the mixing chamber by the ejector piston is provided when the baffles are withdrawn from the mixing chamber, but even in this known case, the liquid component mixture which is driven through a plurality of constrictive gaps, and which is injected at great velocity into the mixing chamber, is not subjected to a sufficient quieting of the turbulence produced, which is the cause of flaws in the product being manufactured, especially a molding.

The invention is addressed to the problem of creating a mixing head for the mixing of at least two plastic-forming components, of the kind described above, in which, while retaining the mechanical self-clearing of the exit passage and mixing chamber by the ejector piston and the intensive mixing of the reaction components, a quieting of the liquid component mixture after leaving the mixing chamber can be achieved by constructionally simple, unproblematic means, to such an extent that flaws in the product due to mixing turbulence will be prevented to the greatest possible extent.

The choke member forms at the exit end of the mixing chamber a constrictive gap extending across the cross section of the exit passage and by means of a choking effect improving the intensity of the mixing. The constrictive gap flares diffuser-like toward the exit opening of the exit passage in order thus to achieve within the mixing head, by the known diffuser effect, such an extensive quieting of the liquid component mixture, i.e., a transformation of the turbulent flow to a substantially laminar flow, that flaws in the product, which otherwise are produced by persisting turbulence, are prevented to the greatest possible extent. The choke member can be configured in an especially simple manner as a sliding valve, but not one which is provided with an opening for the passage of the mixture components when the choke member is in the choking position, but instead one which with its lateral edge extending into the outlet passage forms the choke gap, while the cavity beginning at this lateral edge is used only when the choke member is in the ejecting position in which the cavity is aligned with the outlet passage. Thus, it is easily possible by means of the ejector piston to eject the reaction mixture remaining in the mixing chamber and in the exit passage toward the end of the mixing or mold filling process, in order thus to bring about the desired self-clearing of exit passage and mixing chamber.

The guiding and exit passages, as well as the eject piston which has the same cross section as they do, have basically any desired, suitable cross sectional shape, the cross-sectional shape of the cavity in the choke member having always the same cross section as the passage cross section, in order to assure that the cross section of the cavity of the choke member and of the exit passage will be aligned when the choke member is in the ejecting position. In the interest of using simple sealing means for the ejecting piston, and for avoiding sealing problems, a configuration is preferred in which the cross section of the guiding and exit passages will be circular and accordingly the cross section of the cavity in the choke member will be a congruent circular cross section.

Numerous additional features and advantages of the invention will be found in the additional subordinate claims and in the following description in conjunction with the drawing in which several embodiments of the subject matter of the invention are diagrammatically represented.

BRIEF DESCRIPTION OF THE DRAWINGS

FIG. 1 is a longitudinal cross section through a first embodiment of mixing head with the eject piston and the choke member in the mixing position, FIG. 2 is a section taken along line II—II of FIG. 1, FIG. 3 is a section along line III—III of FIG. 2, FIG. 4 is a section along line IV—IV of FIG. 2, FIG. 5 is a section along line V—V of FIG. 2, FIG. 6 is a representation corresponding to FIG. 1, in which, however, the eject piston and the choke member are in their ejection position and clearing position, respectively, FIG. 7 is a section taken along line VII—VII of FIG. 6, FIG. 8 is a longitudinal section corresponding to FIG. 2 through another embodiment of a mixing head with the eject piston and the choke member in the mixing position, FIG. 9 is a section along line IX—IX of FIG. 8, FIG. 10 is a longitudinal section corresponding to FIGS. 2 and 8, respectively, through an additional embodiment of a mixing head with the eject piston and choke member in the mixing position, FIG. 11 is a section along line XI—XI of FIG. 10, FIG. 12 is a section along line XII—XII of FIG. 10, and FIG. 13 is a representation like FIG. 12 for presenting a modified working position of the choke member.

DESCRIPTION OF THE PREFERRED EMBODIMENTS

In the drawing there is shown a mixing head, identified as a whole by the number 1, for mixing at least two reaction components which in their reaction form a plastic, e.g., a polyurethane foam. The mixing head 1 consists of a casing 2 with a guiding passage 3 in which an eject piston 4 is guided for reciprocating movement. A portion of the guiding passage 3 forms a mixing chamber 5 which, when the eject piston 4 is in the withdrawn position shown for example in FIGS. 1 and 2, is defined at one end by the piston's front face 6. The other end of the mixing chamber 5 is defined by the top 7 of a choke member 8 opposite the end face 6 of the eject piston 4. From component feed lines 9 and 10, inlet openings 11 and 12 lead into the mixing chamber 5. Return lines are identified at 13 and 14. At its end remote from the mixing chamber 5 the eject piston 4 is in the form of a double-acting hydraulic piston 15 which is guided in a cylinder 14 having corresponding feed connections 17 and 18.

Also shown in FIG. 1 are supply tanks 19 and 20 for the two reaction components from which the components are injected at high velocity each by means of a proportioning pump 21, 22, through the feed lines 9 and 10 into the mixing chamber according to the counterflow injection principle, in order there to form the reaction mixture. At the end of the injection period, two-way valves 23 and 24 are switched to the return lines 13 and 14 so that the components fed from the supply tanks 19 and 20 can be circulated. For the performance of this operation the mixing head can be controlled in a known manner by nozzles, pressure or pistons.

The choke member 8 extends in its length from the mixing chamber 5 substantially to the outlet opening 25 of the guiding passage 3 which in this area forms an outlet passage 26. At the same time the choke member is supported in the mixing head casing 2 for transverse movement with respect to the exit passage 26 and is movable back and forth between a working position and a clearing and ejection position. This reciprocating movement of the choke member 8 is rendered visible in the drawing by double-headed arrows 27.

In the case of the embodiment represented in FIGS. 1 to 7, the choke member 8 is formed by a sliding plate 28 which has a basic wedge shape and, with respect to its direction of displacement 27, it has the side faces 29 and 30 as well as end faces 31 and 32. The end face 31 can be engaged, for example, by an actuator (not shown) for the reciprocating movement of the slide plate 28. At the same time the slide plate 28 as a whole is supported and guided for transverse movement in an inner recess 33 in the mixing head casing, this recess being open at both ends in the case of the one represented.

While the side face 29 has an outer area 34 suitable for guiding it in the recess 33, especially a planar outer area, the side face 30, which reaches into the exit passage 26, is provided with a cavity 35, which runs through the height of the slide plate 28 and interrupts its otherwise planar outer surface 36.

The cross section of the guiding and exit passages 3 and 26, respectively, and of the eject piston 4 of identical cross section, is circular in the example represented, and accordingly the cavity 35 of the choke member 8 has a cross section in the form of a segment of a circle that is congruent with the cross section of the exit passage 26. The basic shape of the choke member 8 and of the slide plate 28, which is a wedge shape, is achieved by the fact that the side 30 of the slide plate 28 slopes at its outer surface 36 toward the exit opening 25 of the exit passage 26, so that, with the choke member 8 in the choking position visible in FIGS. 1 to 5, the free cross section of the exit passage 26 is partially defined by the outer surface 36 and accordingly reduced. In this manner, a segment-shaped choke gap 38, whose cross-sectional area increases toward the exit opening 25, is formed by the outer surface 36 with the wall 37 of the exit passage 26, which defines the remaining part of the free passage cross section. When the choke member 8 is in the choking position, the outer surface 36 of the slide plate 28 defines a chord of the circular passage cross section in all cross-sectional planes, as it can be seen especially in the cross-sectional representations in FIGS. 3 to 5, which show cross sections at different levels in the choking gap 38 and thus explain its segment-shaped cross section which increases continuously toward the exit opening 25. This signifies a diffuser-like flaring of the choke gap 38 toward the exit opening 25, which leads to an extensive quieting of the liquid component mixture.

When the choke member 8 is in the choking position, the cavity 35 is held in a waiting position outside of the exit passage 26 in the mixing head casing 2. This position may be seen especially in FIGS. 3 to 5 which furthermore indicate that, due to the tapering of the outer surface 36 of the slide plate 28 toward the passage exit area 25, the segment-shaped cross section of the choke gap 38 diminishes progressively toward the passage exit opening 25. This is due to the fact that the centers of the circles of the cross section of the guiding and ejection passages 3 and 26, on the one hand, and of the segment of the cavity 35 which varies in magnitude over the length of the choke member 8 on the other, are disposed in a common vertical plane running in the direction of displacement 27.

From this it follows that, when a displacement of the choke member 8 occurs according to the double arrow 27, from the choking position represented in FIGS. 1 to 5 to the clearing and ejecting positions represented in FIGS. 6 and 7, respectively, the cavity 35 has been brought into alignment with the ejection passage 26, so that the eject piston 4 of regular cross section can be guided through the cylindrical passage formed in common by the cavity 35 of the choke member 8 and the wall 37 of the ejection passage 26 to perform its ejection and clearing stroke and be drawn back to the mixing position in which the choke member 8 also has been brought back to the mixing position according to FIGS. 1 to 5.

In the embodiment according to FIGS. 8 and 9, the choke member 8 is formed by two slide plates 28 which are guided with their surface portions 36 opposite one another in the mixing head casing 2. The two slide plates 28 in this configuration form with their surface portions 36 diverging from one another toward the passage exit opening 25 a substantially rectangular choke gap 38' with a cross section which expands diffuser-like toward the exit opening 25. Only at its two narrow sides is the cross section of the diffuser gap 38' defined by segments of the passage cross section which increase in size in accordance with the cross section expanding toward the exit opening 25.

In FIGS. 8 and 9 the choke member 8 is shown in its choke position. By a displacement of the slide plates 28 in the direction of the arrow 27, the two marginal recesses 35 of the two slide plates 28 are brought into alignment with the exit passage 26, so that the eject piston 4 can perform its clearing stroke, as it has been explained in detail above in conjunction with the first embodiment. The sliding movement of the slide plates 28 can be performed by means of a common actuator which engages the end faces of both the slide plates 28, which are in a mirror-image cross-sectional arrangement on either side of a central longitudinal plane of symmetry of the exit passage 26.

In the additional embodiment according to FIGS. 10 to 13, the choke member 8 is again formed by two slide plates 28' and 28" of a basic wedge shape, which are guided for reciprocating movement in the directions of the arrow 27 in the mixing head casing 2. In contrast to the embodiment shown in FIGS. 8 and 9, the slide plates 28' and 28" are of unequal length longitudinally of the exit passage 26, the longer slide plate 28" forming, with its outer surface 36 together with the confronting wall 37 of the exit passage 26, in the area overlapping the shorter slide plate 28' in the choking position, a secondary mixing chamber 39 between the expanding choke gap 38' and the mixing chamber 5, with which it communicates through a connecting gap 40. It its opposite end, the secondary mixing chamber 39 merges through a slot-like constriction with the choke gap 38'. Inasmuch as the outer surface 36 of slide plate 28' enters, in the choke position represented, into the circular exit passage, the secondary mixing chamber 39 has a segment-shaped cross section which expands toward the diffuser gap 38', while the diffuser gap 38' in this case, on account of the confronting planar surface portions 36 of the two slide plates 28' and 28", has a substantially rectangular cross section expanding toward the exit opening 25, in a manner similar to the embodiment shown in FIGS. 8 and 9. In order to form the secondary mixing chamber 39, in this embodiment the slide plate 28" also has a greater width, especially in the upper part overlapping the slide plate 28', in which it is brought with its outer surface 36 close to the confronting wall 37 of the exit passage 26 to form the secondary mixing chamber 39.

In this embodiment also the choke member 8 is shown in its choke position, and it is displaced in the direction of the arrows 27 to bring it to the ejection and clearing position in which the confronting surface portions 36 of the two slide plates 28' and 28" are brought into alignment with the exit passage 26, so that the eject piston 4 can perform the clearing stroke through the completed circular cross section. To produce the displacement in the direction of the double arrow 27, a common actuator can be provided which engages the ends of the slide plates 28' and 28", as in the case of the embodiment represented in FIGS. 8 and 9.

In the variant shown in FIG. 13, a separate actuator (not shown) is provided for the displacement of the two slide plates 28' and 28" in accordance with the double arrow 27, and it engages the ends 32 of the slide plates 28' and 28". In this configuration, in addition to the mode of operation represented in FIGS. 10 to 12, with slide plates 28' and 28" displaced each equally between the choking position and the ejection position, a mode of operation is possible in which one of the two slide plates 28' and 28" is held in the choke position and the other slide plate in the ejection position. According to the example represented in FIG. 13, the slide plate 28' is held in the ejection position while the slide plate 28" is in the choke position. By this special actuation of the slide plates 28' and 28" the possibility is created either for providing only one accordingly enlarged choke gap 38''', which then, on the basis of the arrangement of the marginal recess 35 of slide plate 28' in alignment with the ejection passage wall, has a segment-shaped cross section similar to the choke gap 38 according to the first embodiment. Instead, the possibility exists of using the secondary mixing chamber 39 by shifting the slide plate 28', in order further to improve the intensive mixing of the reaction components with a simultaneous increase in the dissipation of energy.

Such a secondary mixing chamber immediately following the mixing chamber 5 can also, according to another variant not shown, be formed by shaping the profile of at least one of the confronting surface portions 36 of the two slide plates 28 of the choke member 8.

It will be apparent that the mixing head in all of the embodiments can be used either for continuous production or for the intermittent production of moldings. The eject piston 4 is then always brought into its clearing position, according to FIGS. 6 and 7, whenever a work cycle with given mixture components has ended. The inlet openings 11 and 12 for the mixture components always lead into the mixing chamber above the plane of entrance of the choke gap 38, 38' and 38", and of the connecting gap 40. In accordance with the drawing, the inlet openings 11 and 12 always lead into the mixing chamber 5 from diametrically opposite wall areas of the guiding passage 3, so that the mixture components are injected into the mixing chamber 5 according to the counterflow injection principle. It is to be understood, however, that the entry openings 11 and 12 can also be arranged in the wall of the guiding passage 3 such that the emerging streams of mixture components are aimed at an angle to one another.

The same reference numbers have been used in the above-described embodiments for identical or corresponding parts, and therefore the description of such like parts has been omitted.

I claim:

1. A mixing head for mixing at least two components forming a synthetic material comprising a housing having a guide channel, a discharging piston reciprocably disposed in said guide channel, one portion of said guide channel defining a mixing chamber and another portion of said guide channel forming an outlet channel, said outlet channel having an outlet opening, inlet means for the components leading to said mixing chamber, said piston having a withdrawn position, said piston having an end face which defined a boundary of said mixing chamber when said piston is in said withdrawn position, a choke means mounted on said housing for sliding movement transversely of said guide channel between an operable position and a clearing position, said choke means when in said operable position being disposed partially in said outlet channel and defining another boundary of said mixing chamber, said choke means when in said operable position forming a choke passage in said outlet channel, said choke passage having a choke gap and a diffusor-like flared portion which progressively increases in cross-sectional area as said outlet opening of said outlet channel is approached, said choke means having a cavity having a cross-sectional configuration corresponding to at least a portion of the cross-sectional configuration of said guide channel such that when said choke means is in said clearing position, said cavity aligns with said outlet channel to form a clear continuation of said outlet channel, such that said piston is reciprocable from said withdrawn position to a clearing position in which said piston moves into said outlet channel to clear said outlet channel of said components.

2. A mixing head according to claim 1 wherein said outlet channel has a circular cross-sectional configuration and said cavity in said choke means has a cross-sectional configuration defined by a congruent segment of a circle corresponding to said circular cross-sectional configuration of said outlet channel.

3. A mixing head according to claim 2 wherein said choke means has a planar side surface which defines a portion of said choke passage, said side surface extending into said guide channel when said choke means is in said operable position to form a chord of said circular cross section of said guide channel.

4. A mixing head according to claim 3 wherein said planar side surface of said choke means extends at an acute angle relative to the longitudinal axis of said guide channel, said cavity being defined by cavity walls extending inwardly from said side surface, said cavity walls being of a partial circular configuration defined by a portion of a cylinder having a cylindrical axis which is parallel to the axis of said outlet channel, whereby the depth of said partial circular walls of said cavity progressively decreases as said outlet opening of said outlet channel is approached.

5. A mixing head according to claim 3 wherein said side surface of said choke means cooperates with said outlet channel to define said choke passage, said side surface progressively sloping relative to the longitudinal axis of said outlet channel as said outlet opening of said outlet channel is approached, said side surface having an upstream edge extending from said choke gap.

6. A mixing head according to claim 1 wherein said housing has a transverse passage extending perpendicular to the axis of said outlet channel said transverse passage intersecting said outlet channel, said choke means comprising a choke plate slidable in said transverse passage between said operable and said clearing position.

7. A mixing head according to claim 1 wherein said choke means comprises two choke plates disposed on opposite sides of said outlet channel with each of said choke plates being slidable on said housing between said operable and said clearing positions, each of said choke plates defining parts of said choke passage.

8. A mixing head according to claim 7 wherein each of said choke plates has a planar side surface which defines a portion of said choke passage such that said choke passage has a substantially rectangular cross-sectional configuration which progressively increases in cross-sectional area as said outlet opening of said outlet channel is approached.

9. A mixing head according to claim 7 wherein each of said choke plates has a generally wedge shaped cross-sectional configuration in a plane perpendicular to the direction of movement of said choke plates when the latter are moved between said operable and clearing positions.

10. A mixing head according to claim 7 wherein each of said two choke plates are mirror images of one another relative to a longitudinal plane of symmetry passing through the longitudinal axis of said outlet channel.

11. A mixing head according to claim 7 further comprising actuating means for simultaneously moving said two choke plates between said operable and clearing positions.

12. A mixing head according to claim 7 further comprising actuating means for separately moving said two choke plates between said operable and clearing positions.

13. A mixing head according to claim 7 wherein each of said choke plates has an upstream end portion, said two choke plates being of different height so that the upstream end portion of one choke plate is disposed closer to said mixing chamber than the upstream end portion of said other choke plate, said upstream end portion of said one choke plate being disposed opposite a section of the outlet channel which overlies the upper end portion of said other choke plate, said upper end portion of said one choke plate and said section of said outlet channel defining a secondary mixing chamber.

14. A mixing head according to claim 13 wherein each of said two choke plates have a planar side surface disposed in said outlet channel when said choke means is in said operable position, each of said side surfaces being disposed at an acute angle relative to the the longitudinal axis of said outlet channel, said side surface of said other choke plate having an upper edge which is spaced from said side surface of said one choke plate to define said choke gap.

15. A mixing head according to claim 14 wherein said side surface of said one choke plate has an upper edge which overlies said upstream end portion of said other choke plate.

16. A mixing head according to claim 13 wherein said other choke plate has an upper end surface, said secondary mixing chamber being further defined by said upper end surface.

17. A mixing head according to claim 13 wherein said one choke plate has an upper end surface which partially defines the first said mixing chamber.

18. A mixing head according to claim 14 wherein said upstream end portion of said one choke plate which partially defines said secondary mixing chamber is formed by said side surface of said one choke plate such that said secondary mixing chamber thereby has a progressively increasing cross-sectional area as said choke gap is approached.

19. A mixing head according to claim 7 wherein said choke passage has a substantially rectangular cross-sectional configuration which progressively increases in cross-sectional area as said outlet opening of said outlet channel is approached.

* * * * *